US012646527B2

(12) United States Patent
Brownlee et al.

(10) Patent No.: US 12,646,527 B2
(45) Date of Patent: Jun. 2, 2026

(54) SYSTEM AND METHOD FOR IDENTIFYING SENTIMENT (EMOTIONS) IN A SPEECH AUDIO INPUT WITH HAPTIC OUTPUT

(71) Applicant: Valence Vibrations, Inc., Los Angeles, CA (US)

(72) Inventors: Shannon Modine Brownlee, Carlsbad, CA (US); Chloe Jordan Duckworth, San Jose, CA (US)

( * ) Notice: Subject to any disclaimer, the term of this patent is extended or adjusted under 35 U.S.C. 154(b) by 0 days.

(21) Appl. No.: 17/831,407

(22) Filed: Jun. 2, 2022

(65) Prior Publication Data

US 2023/0298616 A1 Sep. 21, 2023

Related U.S. Application Data

(60) Provisional application No. 63/196,264, filed on Jun. 3, 2021.

(51) Int. Cl.
| | |
|---|---|
| *G10L 25/63* | (2013.01) |
| *G10L 15/16* | (2006.01) |
| *G10L 21/10* | (2013.01) |
| *G10L 25/24* | (2013.01) |
| *G10L 25/30* | (2013.01) |

(52) U.S. Cl.
CPC .............. *G10L 25/63* (2013.01); *G10L 15/16* (2013.01); *G10L 21/10* (2013.01); *G10L 25/24* (2013.01); *G10L 25/30* (2013.01)

(58) Field of Classification Search
None
See application file for complete search history.

(56) References Cited

U.S. PATENT DOCUMENTS

| | | | |
|---|---|---|---|
| 6,691,090 B1 | 2/2004 | Laurila | |
| 11,495,215 B1 * | 11/2022 | Wu | ..................... G10L 15/16 |
| 11,501,794 B1 * | 11/2022 | Kim | ................... G10L 15/1815 |
| 11,854,538 B1 * | 12/2023 | Rozgic | .................. G10L 25/63 |
| 2001/0056349 A1 | 12/2001 | St. John | |
| 2002/0194002 A1 | 12/2002 | Petrushkin | |
| 2016/0217807 A1 | 7/2016 | Gainsboro | |
| 2018/0322863 A1 * | 11/2018 | Bocklet | ................ G10L 19/008 |
| 2020/0035222 A1 | 1/2020 | Sypniewski | |

(Continued)

OTHER PUBLICATIONS

Fernandes et al., "Speech Emotion Recognition using Mel Frequency Cepstral Coefficient and SVM Classifier," 2018 International Conference on System Modeling & Advancement in Research Trends (SMART), Moradabad, India, 2018, pp. 200-204, doi: 10.1109/SYSMART.2018.8746939. (Year: 2018).*

(Continued)

*Primary Examiner* — Pierre Louis Desir
*Assistant Examiner* — Daniel W Chung
(74) *Attorney, Agent, or Firm* — Inventors Assistance Foundation; Jurgen Klaus Vollrath

(57) ABSTRACT

In a system and method for enabling a user to identify the emotions of speakers to a conversation, spoken audio input is pre-processed using a one-dimensional Mel Spectrogram and/or a two-dimensional Mel-Frequency Cepstral Coefficient (MFCC) matrix, reducing the two-dimensional matrix to a single dimension output, identifying at least one emotion in the audio input using a convolutional or recurrent neural network, and providing the user with haptic feedback corresponding to the at least one emotion in the audio input.

8 Claims, 10 Drawing Sheets

(56) References Cited

U.S. PATENT DOCUMENTS

| | | | |
|---|---|---|---|
| 2020/0075039 A1* | 3/2020 | Eleftheriou | ........... G06V 40/20 |
| 2022/0084543 A1 | 3/2022 | Sinha | |
| 2022/0254332 A1* | 8/2022 | Cartwright | ........... G10L 15/005 |

OTHER PUBLICATIONS

S. K. Pandey, H. S. Shekhawat and S. R. M. Prasanna, "Deep Learning Techniques for Speech Emotion Recognition: A Review," 2019 29th International Conference Radio elektronika (RADIOELEKTRONIKA), Pardubice, Czech Republic, 2019, pp. 1-6, doi: 10.1109/RADIOELEK.2019.8733432 (Year: 2019).*

* cited by examiner

Figure 6A:
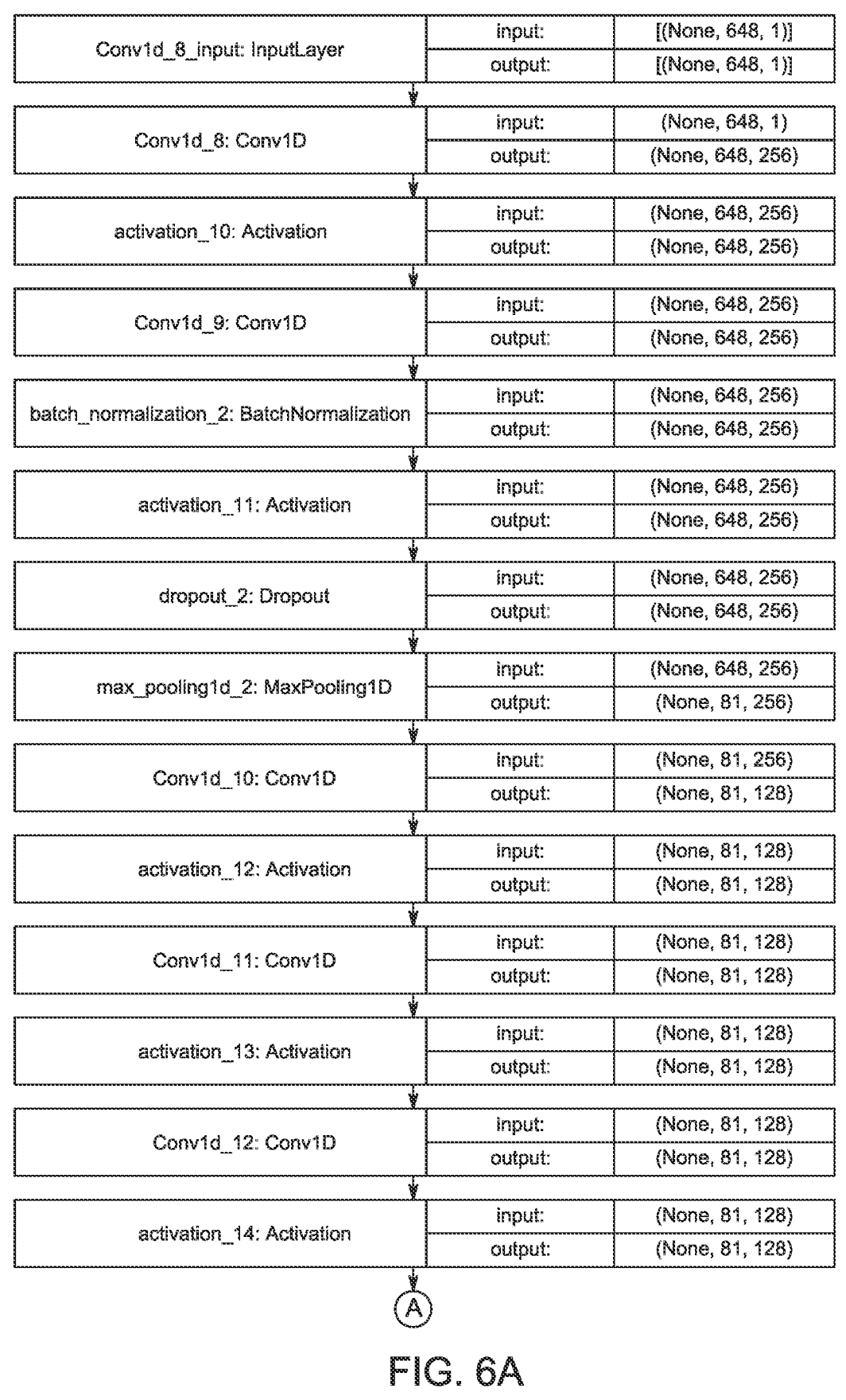

| Conv1d_8_input: InputLayer | input: | [(None, 648, 1)] |
|---|---|---|
| | output: | [(None, 648, 1)] |

| Conv1d_8: Conv1D | input: | (None, 648, 1) |
|---|---|---|
| | output: | (None, 648, 256) |

| activation_10: Activation | input: | (None, 648, 256) |
|---|---|---|
| | output: | (None, 648, 256) |

| Conv1d_9: Conv1D | input: | (None, 648, 256) |
|---|---|---|
| | output: | (None, 648, 256) |

| batch_normalization_2: BatchNormalization | input: | (None, 648, 256) |
|---|---|---|
| | output: | (None, 648, 256) |

| activation_11: Activation | input: | (None, 648, 256) |
|---|---|---|
| | output: | (None, 648, 256) |

| dropout_2: Dropout | input: | (None, 648, 256) |
|---|---|---|
| | output: | (None, 648, 256) |

| max_pooling1d_2: MaxPooling1D | input: | (None, 648, 256) |
|---|---|---|
| | output: | (None, 81, 256) |

| Conv1d_10: Conv1D | input: | (None, 81, 256) |
|---|---|---|
| | output: | (None, 81, 128) |

| activation_12: Activation | input: | (None, 81, 128) |
|---|---|---|
| | output: | (None, 81, 128) |

| Conv1d_11: Conv1D | input: | (None, 81, 128) |
|---|---|---|
| | output: | (None, 81, 128) |

| activation_13: Activation | input: | (None, 81, 128) |
|---|---|---|
| | output: | (None, 81, 128) |

| Conv1d_12: Conv1D | input: | (None, 81, 128) |
|---|---|---|
| | output: | (None, 81, 128) |

| activation_14: Activation | input: | (None, 81, 128) |
|---|---|---|
| | output: | (None, 81, 128) |

| Conv1d_13: Conv1D | input: | (None, 81, 128) |
|---|---|---|
| | output: | (None, 81, 128) |

| batch_normalization_3: BatchNormalization | input: | (None, 81, 128) |
|---|---|---|
| | output: | (None, 81, 128) |

| activation_15: Activation | input: | (None, 81, 128) |
|---|---|---|
| | output: | (None, 81, 128) |

| dropout_3: Dropout | input: | (None, 81, 128) |
|---|---|---|
| | output: | (None, 81, 128) |

| max_pooling1d_3: MaxPooling1D | input: | (None, 81, 128) |
|---|---|---|
| | output: | (None, 10, 128) |

| conv1d_14: Conv1D | input: | (None, 10, 128) |
|---|---|---|
| | output: | (None, 10, 64) |

| activation_16: Activation | input: | (None, 10, 64) |
|---|---|---|
| | output: | (None, 10, 64) |

| conv1d_15: Conv1D | input: | (None, 10, 64) |
|---|---|---|
| | output: | (None, 10, 64) |

| activation_17: Activation | input: | (None, 10, 64) |
|---|---|---|
| | output: | (None, 10, 64) |

| flatten_1: Flatten | input: | (None, 10, 64) |
|---|---|---|
| | output: | (None, 640) |

| dense_2: Dense | input: | (None, 640) |
|---|---|---|
| | output: | (None, 14) |

| activation_18: Activation | input: | (None, 14) |
|---|---|---|
| | output: | (None, 14) |

| dense_3: Dense | input: | (None, 14) |
|---|---|---|
| | output: | (None, 7) |

| activation_19: Activation | input: | (None, 7) |
|---|---|---|
| | output: | (None, 7) |

FIG. 6B

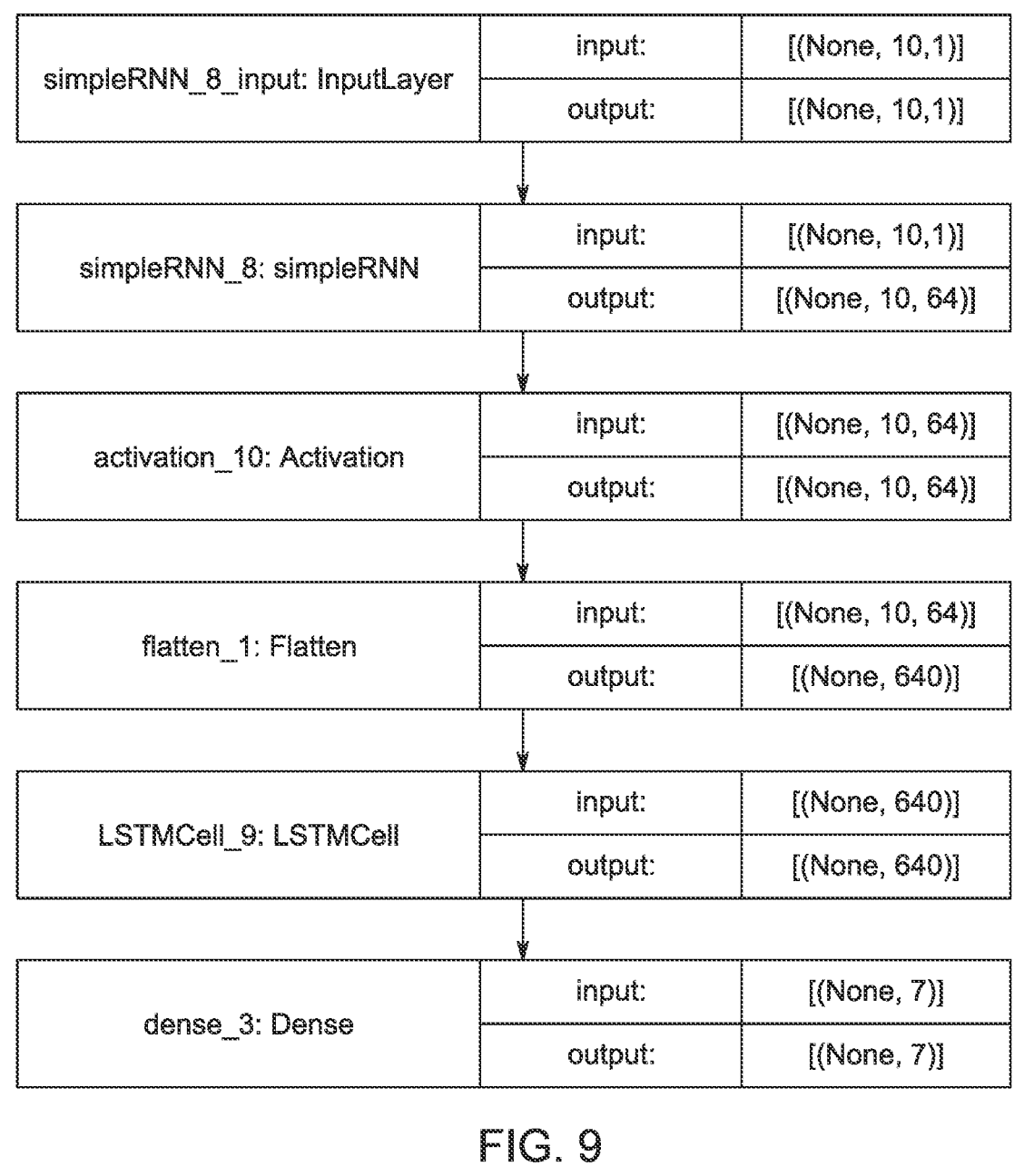

| simpleRNN_8_input: InputLayer | input: | [(None, 10,1)] |
| | output: | [(None, 10,1)] |

| simpleRNN_8: simpleRNN | input: | [(None, 10,1)] |
| | output: | [(None, 10, 64)] |

| activation_10: Activation | input: | [(None, 10, 64)] |
| | output: | [(None, 10, 64)] |

| flatten_1: Flatten | input: | [(None, 10, 64)] |
| | output: | [(None, 640)] |

| LSTMCell_9: LSTMCell | input: | [(None, 640)] |
| | output: | [(None, 640)] |

| dense_3: Dense | input: | [(None, 7)] |
| | output: | [(None, 7)] |

FIG. 9

SYSTEM AND METHOD FOR IDENTIFYING SENTIMENT (EMOTIONS) IN A SPEECH AUDIO INPUT WITH HAPTIC OUTPUT

FIELD OF THE INVENTION

The present invention relates to voice recognition. In particular, it relates to identifying emotional content in speech.

BACKGROUND OF THE DISCLOSURE

Current state-of-the-art emotion detectors suffer from inadequate accuracy for identifying the most dominant emotion from four or more different emotions. Furthermore, since extraction of emotional content from speech relies on speech recognition, a problem for emotional speech processing is the limited functionality of speech recognition systems. Historically, the two most common algorithms in speech recognition systems are Dynamic Time Warping (DTW) and Hidden Markov Models (HMMs). DTW is an approach that was historically used for speech recognition but has now been largely displaced by the more successful HMM approach. HMMs are statistical models which output a sequence of symbols or quantities. They are popular in speech recognition because they can be trained automatically and are simple and computationally feasible to use. Modern speech recognition systems use various combinations of a number of standard techniques in order to improve results over the basic approach of HMMs, including Mel Spectrograms and Mel-Frequency Cepstral Coefficients (MFCCs), which are derived from Mel Spectrograms.

A Mel-Frequency Cepstrum (MFC) is a representation of the short-term power spectrum of sound, based on a linear cosine transform of a log power spectrum on a nonlinear Mel scale of frequency. Mel-Frequency Cepstral coefficients (MFCCs) are coefficients that collectively make up an MFC. The MFC is based on the Mel Spectrogram, which is a graph of frequency and time over the log-scale of the amplitude of an audio file. In the MFC, the frequency bands are equally spaced on the Mel scale, which approximates the human auditory system's response more closely than the linearly-spaced frequency bands used in the normal spectrum. This frequency warping can allow for better representation of sound, for example, in audio compression. Thus, MFCCs are commonly used features in speech recognition systems, such as systems which can automatically recognize numbers spoken into a telephone. When it comes to emotional content, emotion classification models, such as those that utilize MFCCs or the transforms that are used to derive MFCCs, they can also help people of different neurotypes (autism, ADHD, alexithymia, etc), cultures, primary languages, and communication styles empathize with each other through shared emotional understanding.

According to Milton's theory of the double empathy problem, autistic people struggle to interpret the emotions of allistic/non-autistic people, just as allistic/non-autistic people struggle to interpret the emotions of autistic people because their emotional communication styles are different. This problem can be broadened to include people of different cultures, neurotypes, primary languages, and many other demographics which affect communication style. In addition, people with alexithymia specifically struggle to interpret their own emotions and those of other people. A reliable and accurate tool for emotional speech processing could help people identify the emotions of themselves and other people in real-time conversation and connect with others with shared emotional understanding.

Thus, while general emotion recognition concepts are known, there are still issues with emotional speech processing's poor accuracy of detecting the correct emotion and insufficient processing capability. Poor accuracy and insufficient processing capability are grave problems because they make a potentially life-altering technology, emotional speech processing, unreliable and functionally impractical. Furthermore, no suitable conventional technology performs sensory substitution or augmentation by relaying emotions as haptic feedback on an external device. Therefore, improvements to both the accuracy and processing capability of emotional speech processing are needed to make the technology more reliable and practical, as well as to provide haptic feedback so that a user can feel and interpret the emotional valence of themself and/or others with whom they speak.

Accordingly, a need remains for a system, method, and computer program product (software/algorithm/model) that analyzes a voice/speech input to identify emotions in order to overcome at least one of the above-noted shortcomings.

SUMMARY OF THE INVENTION

Exemplary embodiment(s) of the present disclosure relate to speech recognition software and, more particularly, to a specially configured system, method, and computer program product (software/algorithm/model) that analyzes a voice/speech input to identify emotions and generate an associated output in the form of a haptic feedback. The haptic feedback output may comprise vibration of an electronic device (e.g., wearable wristband) so the user can feel the emotions of their own voice and of the person(s) with whom the user is speaking.

BRIEF DESCRIPTION OF THE DRAWINGS

FIGS. 6A and 6B show one embodiment of the neural network architecture including the machine learning model built into the product;

FIG. 9 shows another embodiment of a neural network architecture including the machine learning model built into the product.

DETAILED DESCRIPTION OF THE DISCLOSURE

Figure 1:
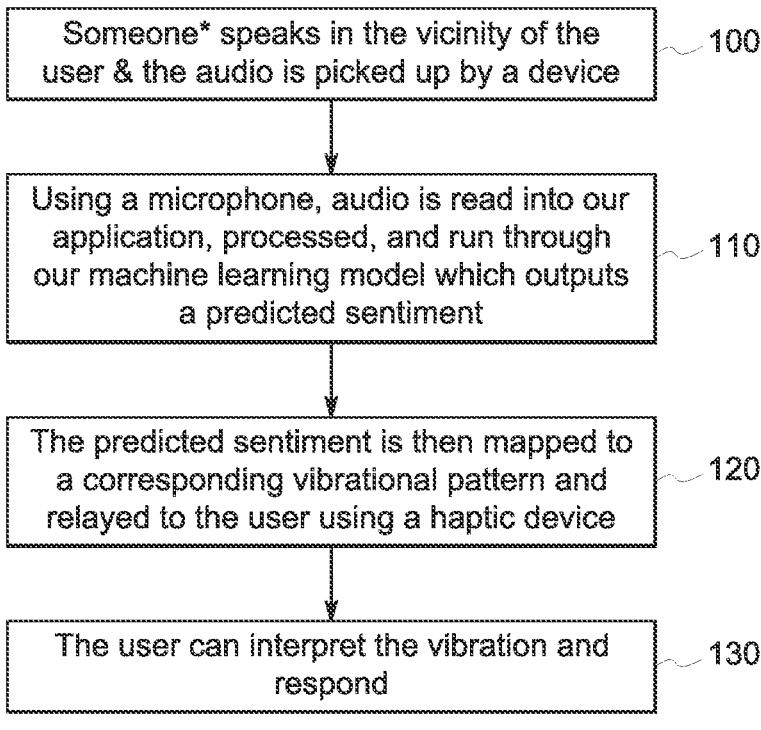
FIG. 1 is a block diagram of the logic steps involved in one embodiment of an implementation of the invention.

The novel features believed to be characteristic of the exemplary embodiment(s) are set forth with particularity in the appended claims. The disclosure itself, however, both as to its organization and method of operation, together with further objects and advantages thereof, may best be understood by reference to the following description taken in connection with the accompanying drawings.

The non-limiting exemplary embodiment(s) will now be described more fully hereinafter with reference to the accompanying drawings, in which a preferred embodiment of the disclosure is shown. Such exemplary embodiment(s) may, however, be embodied in many different forms and should not be construed as limited to the embodiment set forth herein. Rather, these embodiment(s) are provided so that this application will be thorough and complete, and will fully convey the true scope of the disclosure to those skilled in the art.

The below disclosed subject matter is to be considered illustrative, and not restrictive, and any appended claim(s) are intended to cover all such modifications, enhancements, and other embodiment(s) which fall within the true scope of the non-limiting exemplary embodiment(s). Thus, to the maximum extent allowed by law, the scope of the non-limiting exemplary embodiment(s) is to be determined by the broadest permissible interpretation of the claim(s) and their equivalents, and shall not be restricted or limited by the foregoing detailed description.

References in the specification to "an exemplary embodiment", "an embodiment", "a preferred embodiment", "an alternative embodiment" and similar phrases mean that a particular feature, structure, or characteristic described in connection with the embodiment(s) is included in at least an embodiment of the disclosure. The appearances of the phrase "a non-limiting exemplary embodiment" in various places in the specification are not necessarily all meant to refer to the same embodiment.

The non-limiting exemplary embodiments of the present disclosure discussed with respect to FIGS. 1-9 are intended to provide a specially configured system, method, and computer program product (software/algorithm/model) that analyzes a voice/speech input to identify emotions and generate an associated haptic feedback output to a user-worn electronic device (e.g., wearable wristband) so the user can feel the emotions of their own voice and of the person with whom they are speaking. It should be understood that the exemplary embodiment(s) may be used to recognize a variety of emotions associated with different languages, and should not be limited to any particular language or emotion described herein.

As a broad overview, the implementations discussed below with respect to FIGS. 1-10, make use of proprietary software that pre-processes audio data and uses machine learning to detect the emotions expressed in the speech and relays these emotions as unique vibrations on a haptic wristband, to be used as a sensory augmentation tool. A machine learning model analyzes the pitch changes in the speech as defined by the pre-processing stage, determines the emotion being expressed, and then the haptic wristband emits a unique vibration specific to the emotion being expressed, enabling people to feel the emotional valence of those they speak to as an augmented sensory experience.

Thus, the present disclosure interfaces speech emotion signals with haptic wristbands to express emotions as vibrations. While the present embodiments rely purely on tonal analysis to extract emotional content, it will be appreciated that this may be augmented with facial and body imaging content, using computer vision, and/or and biometric analysis, to corroborate the emotional analysis obtained from the voice sample. The structure, data, and classification of the speech emotion has been altered significantly over the prior art. The neural network contains a unique architecture, wherein the training data frame contains different classes along with Mel Spectrum and/or MFCC values. The classes of the data frame include the emotions which our model is classifying, along with other signal information such as silence and noises to identify non-speech that will not include emotion information. In one embodiment the model classified the emotions: happy, sad, fearful, disgusted, angry, surprise, and neutral. The Mel Spectrum and/or MFCC values are the data that the neural network uses to find patterns that can be used to identify each class in this embodiment; these are included in the data frame alongside the classes.

Referring to FIG. 1, in a non-limiting exemplary embodiment, the speech analysis includes capturing a speech sample (Step 100) using a microphone; pre-processing the speech sample and then identifying emotional content using machine learning (Step 110) to define an emotional output signal; converting the emotional output signal into haptic feedback form, e.g., in the form of a unique vibration of a haptic wristband (Step 120), and presenting the haptic feedback to the user (Step 130). The proprietary data pre-processing pipeline and machine learning model will be described in greater detail below. In one embodiment the pre-processing stage together with the machine learning model analyzes the pitch changes in a person's speech and determines the emotion being expressed. In the present embodiment the unique vibration on the haptic wristband is specific to the emotion being expressed and enables the user to feel the emotional valence of their own voice and/or other people they speak to, thereby allowing the user to strengthen relationships with others through shared emotional understanding.

Figure 2:
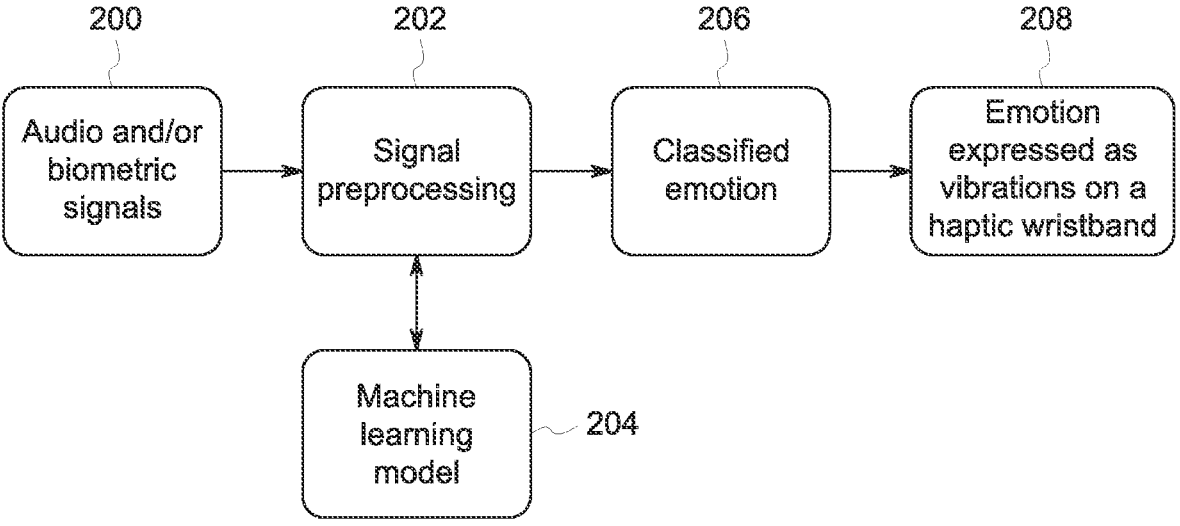
FIG. 2 is block diagram of the logic steps involved in one generic embodiment of an emotion detector system of the invention.

As shown in FIG. 2, audio input or biometric signal input 200 or a combination of both is fed into a signal processor where it is pre-processed prior to being fed into the machine learning model (step 202). A machine-learning model is invoked in step 204 to identify the emotional parameters in the input signal. The machine learning model classifies the predominant emotions in step 206 whereafter the emotion is translated into haptic feedback (step 208) by means of a wristband in this embodiment.

Figure 3:
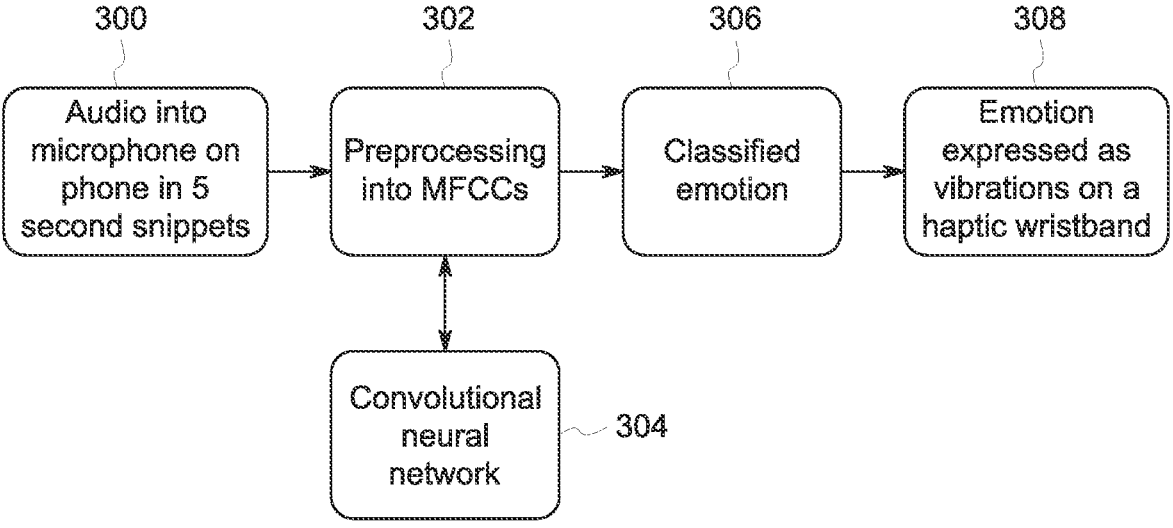
FIG. 3 is a block diagram of the logic steps involved a specific implementation of the generic embodiment of FIG. 2.

FIG. 3 shows a more specific implementation of the generic logic flow of FIG. 2. The audio input or biometric signal input 300 is captured in short snippets, e.g., 3 to 20 second snippets and fed into a signal pre-processing function which in this case comprises an MFCC (step 302). The pre-processing function extracts pitch changes in the audio snippets. The machine learning model 304, which in this embodiment takes the form of a convolutional neural network, uses the average pitch changes to identify the emotional parameters in the input signal. In another embodiment, the machine-learning model used was a recurrent neural network. As in the generic discussion of FIG. 2, the machine learning model in this case classifies the predominant emotions in step 306 whereafter the emotion is translated into haptic feedback (step 308) by means of a wristband in this embodiment.

Figure 4:
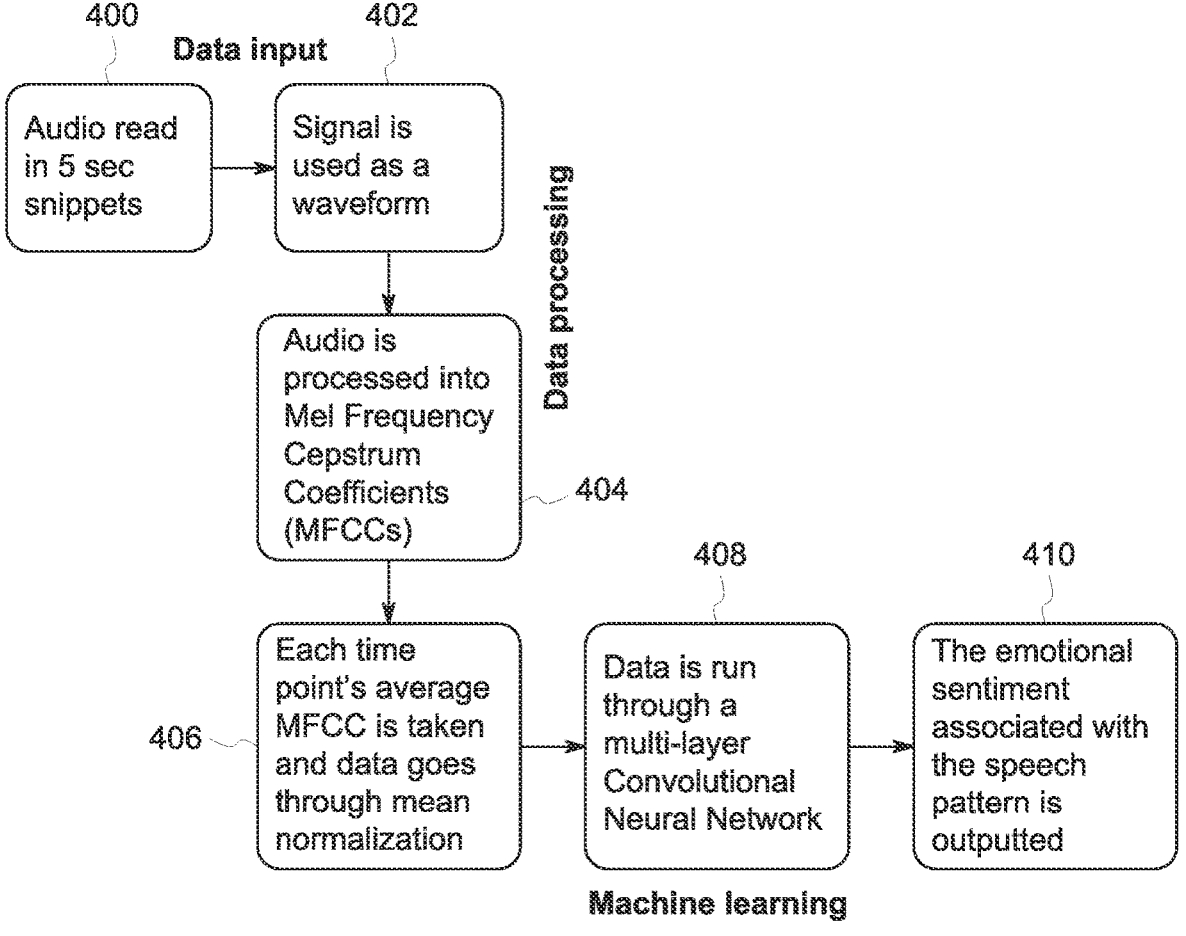
FIG. 4 shows a more detailed diagram of the logic steps involved in one embodiment of an implementation of the invention.

The pre-processing and neural network of FIG. 3 are further defined in FIG. 4, where the audio snippets (Step 400) constitute waveforms (Step 402), the digital versions of which are processed in Step 404 to define MFCCs. It will be appreciated that since MFCCs are derived from Mel Spectrograms, at each time point either the average Mel spectral value or MFCC value is taken and then goes through mean normalization (Step 406), before being run through the neural network (Step 408) to extract the emotional content in the speech pattern (Step 410).

The pre-processing step involves processing a time series of the spoken audio input by transforming the time series into a one-dimensional Mel-Spectrogram and/or a two-dimensional Mel-Frequency Cepstral Coefficient (MFCC) matrix, which is then reduced back to a single-dimension output by means of mean normalization or other dimensionality reduction, before feeding the single dimensional output into the neural network to identify at least one emotion in the audio input. This is illustrated and discussed below with respect to FIG. 5.

Thus, one embodiment of the present disclosure provides, among other things, a system and method for recognizing sentiment from a spoken audio input signal. It provides, among other things, a computerized method for recognizing one or more emotions from the spoken audio input signal. This computerized method includes using a computer to extract exemplary features from the spoken audio input signal, wherein the method includes using a pre-processing stage involving Mel Spectrograms.

The Mel Spectrum value at each time point goes through mean normalization and is then passed through a multi-layered recurrent neural network as discussed above, or through a one-dimensional convolutional neural network, wherein the sentiments associated with the spoken audio input signal are learned during the training phase, and subsequently applied to new audio to select the emotion during runtime.

The present disclosure also provides, among other things, a system, wherein the system includes a computer program product (software) for execution on a computer or mobile device, which may also be implemented as a non-transitory, computer readable medium for recognizing one or more emotions from the spoken audio input signal, the computer readable medium having program code stored therein that when executed is configured to use a computer to extract exemplary features from the spoken audio input signal, wherein the logic of the software includes a Mel Spectrogram and/or Mel-Frequency Cepstral Coefficient (MFCC), and includes a mean normalization step, the system further including a computer configured to define a recurrent or convolutional neural network, which is used to assign at least one sentiment value to the spoken audio input signal based on a first comparison to training data.

In the present implementation of the invention the sentiment value output is communicated as an output signal to a user interface (e.g., user worn wristband) configured to provide haptic feedback associated with the sentiment value.

In one embodiment a transducer converts the output signal into a haptic signal (e.g., mechanical vibration having a unique intensity, temporospatial pattern, frequency, etc. associated with the learned sentiment (emotion) of the audio input signal). Thus, a user is able to learn the sentiment of the person(s) with whom they are conversing or of themselves based on haptic feedback via the watch.

FIGS. 6A and 6B are a graphical representation of one embodiment of the neural network architecture, implemented as a convolutional neural network, defining the machine learning model associated with the product. This is an example of one of the main models used to classify the sentiment of speech once the audio has been preprocessed. Included in this convolutional neural network architecture are one-dimensional convolutional layers configured to recognize patterns, pooling layers to reduce dimensionality, dropout layers to reduce data overfitting, activation layers to transform data into useful numbers, batch normalization layers to stabilize and standardize data, dense layers to reduce the number of data channels, and flatten layers to linearly alter data sizes. Together, this combination of layers shown in the figures is trained on classified input data to generate the mathematical weights and biases stored in the proprietary trained neural network of the same structure. When the software is utilized, new input data is run through this trained neural network to classify emotions. It will be appreciated that the various implementations of the layers mentioned above is by way of example only. Other layer implementations can be used to achieve the same purpose of reducing dimensionality, reducing overfitting, etc. For example, linear alteration of the data size, dimensionality reduction, and/or reduction in the number of data channels could be achieved using rescaling, reshaping, or attention layers, etc. Reduction in data overfitting could be achieved using grid search, activity regularization, or LASSO layers, etc. Data transformation into useful numbers could be achieved using regularization, encoding, or discretization layers, etc. Stabilizing and standardizing data could be achieved using average, masking, or maximum/minimum layers, etc.

As mentioned above, and as illustrated in FIG. 5, input audio is read in as a .wav file and then transformed into a Mel Spectrogram, and possibly further into MFCCs. These MFCCs represent the average change in pitch over time according to the Mel frequency scale, which relates a human's perceived frequency of a tone to the actual frequency of the tone in an effort to better reflect pitch changes that humans can hear. In order to process into MFCCs, the snippets of audio signal are each broken up into overlapping frames or time bands, and each frame is processed in a series of steps, including a Fourier transform, Mel filters, logarithmic reductions, and followed by another Fourier transform. After the final transform, the output is the spectral bands seen in the diagram 500 of FIG. 5. These bands show frequency abundance at a given time. To reduce the dimensionality of these coefficients to a time series, the mean of each time band is taken, as discussed further below, and subsequently fed into the neural network for classification.

Figure 5:
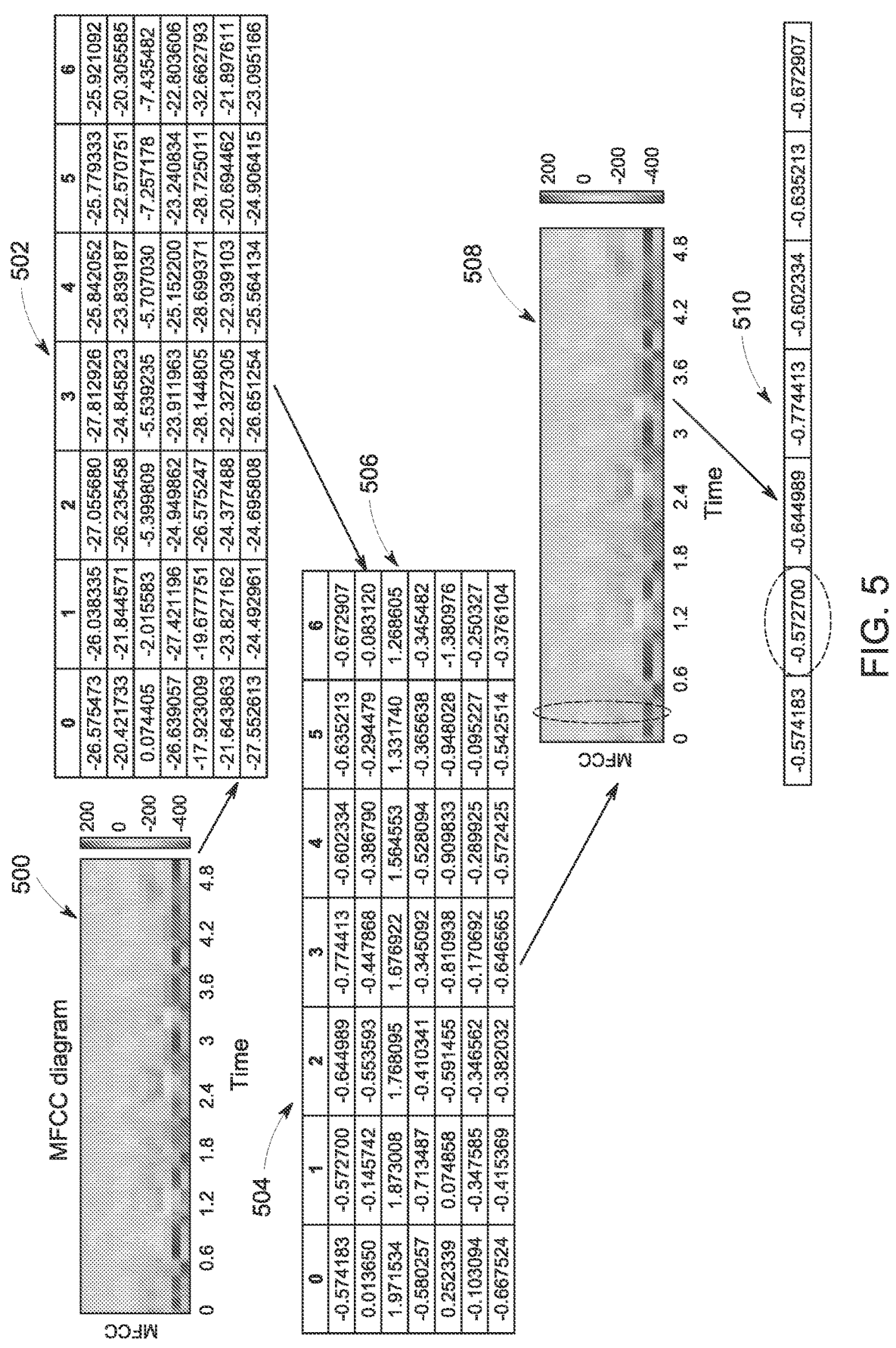
FIG. 5 is a series of diagrams illustrating the pre-processing stage of one embodiment of the present invention.
Figure 7:
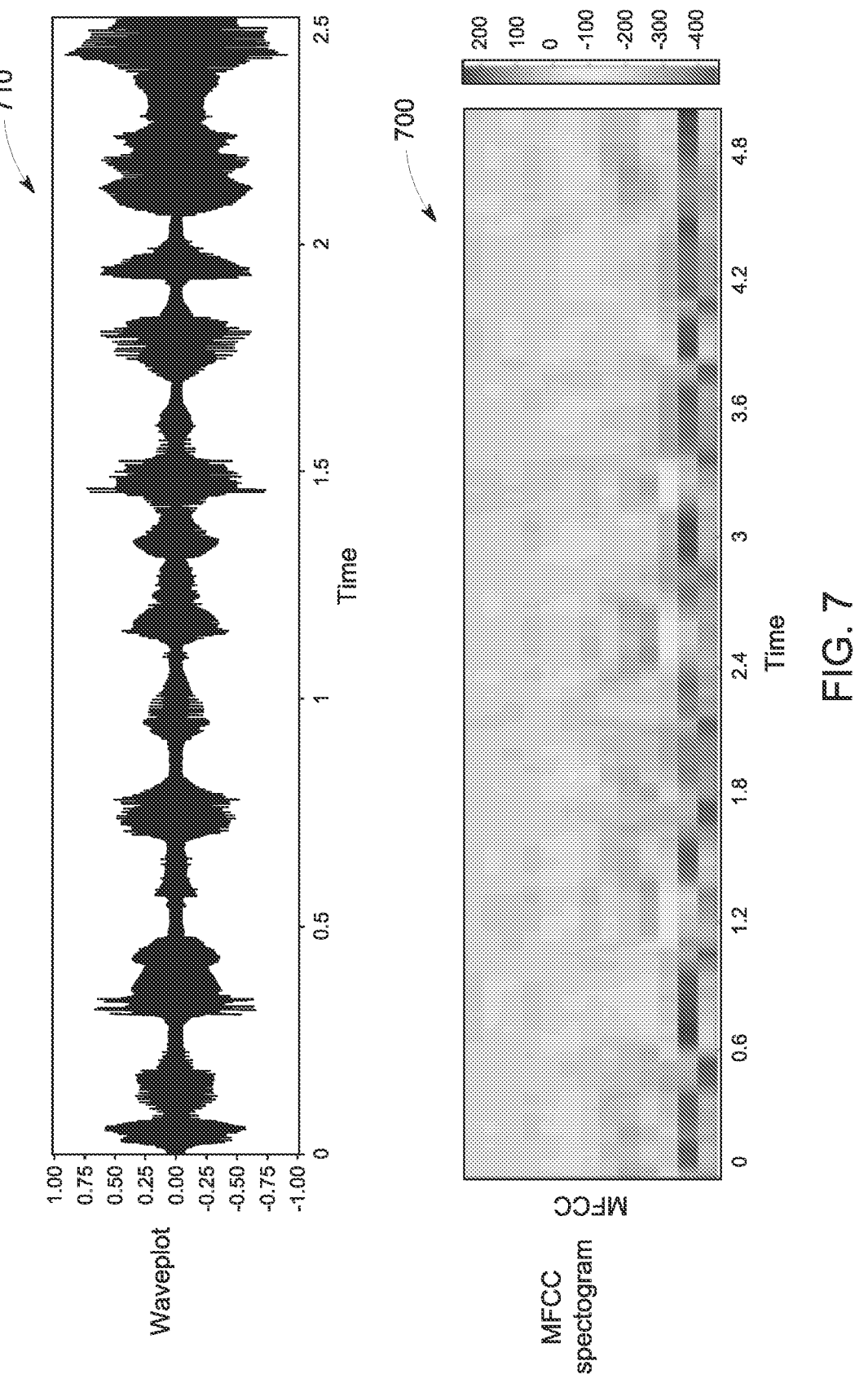
FIG. 7 is a more detailed image of the MFCC diagram in FIG. 5, coupled with a corresponding analog speech input waveform.

Referring to FIG. 5, each vertical column in the MFCC diagram 500 represents a time band or frame, and each row represents a change in the pitch during the time band. The MFCC diagram is shown more clearly in FIG. 7 as diagram 700, corresponding to the analog speech input waveform 710. In the case of MFCCs these pitch changes for the various time bands can be represented by a two-dimensional matrix 502. In order to make processed files more comparable, the present invention performs mean normalization on the matrix 502, as defined by the discussion in step 504. In this embodiment, the mean normalization reduces the size of the number to range between −2 and +2 (as shown in the matrix 506) rather than the previous −30 to +30 range of matrix 502. Thereafter, in order to achieve a dimensionality reduction from a two-dimensional to a one-dimensional matrix, a mean of each time band is taken as discussed in step 508. The result is the one-dimensional matrix 510.

Figure 8:
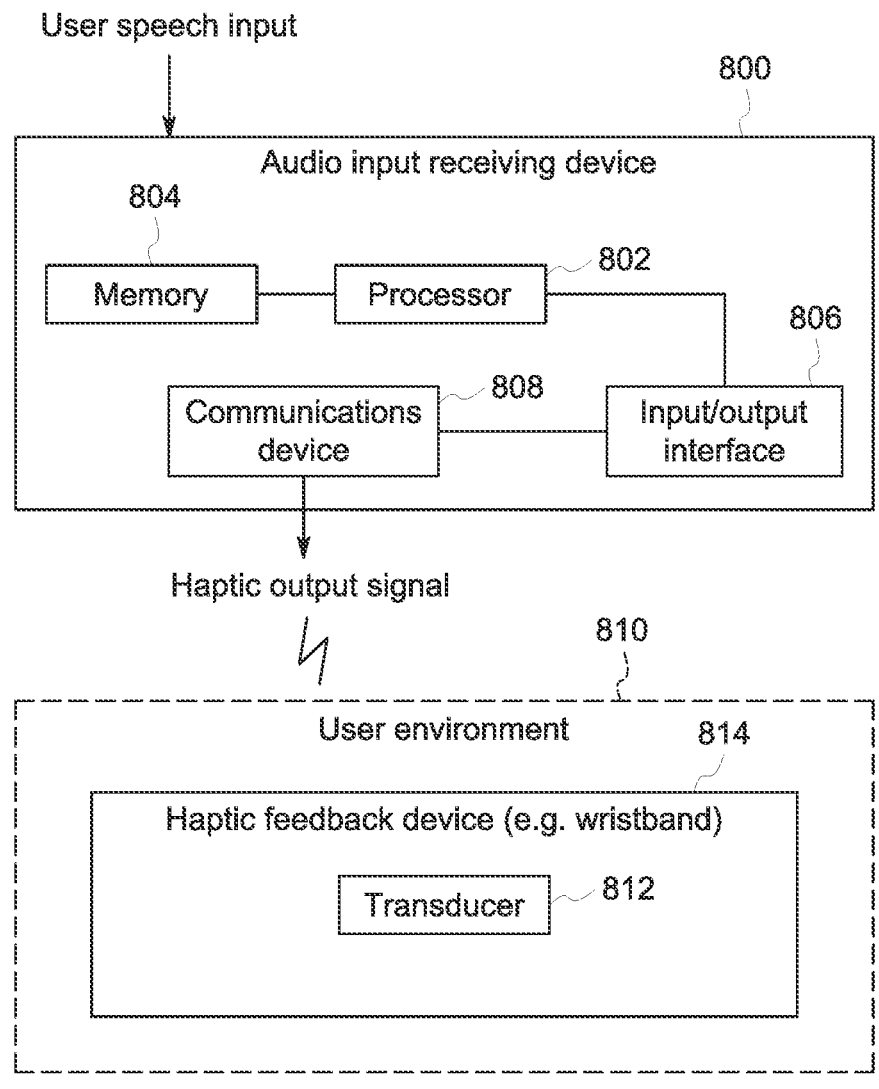
FIG. 8 is a block diagram of one embodiment of a system of the invention.

One implementation of a system of the present invention is shown in FIG. 8. The system includes an audio input receiving device 800, which includes a microphone (not shown), the output of which is typically converted from analog to digital form, e.g., using an A/D converter. The digital signal is fed into a processor 802, which is connected to a memory 804, and includes an I/O interface 806, which is in turn connected to a communications device 808. The digital output signal from the communications device 808, which represents at least one emotion derived from the audio input, is transmitted to the user environment 810. The user environment 810 includes a transducer 812, which converts the signal into a haptic output that allows a user to feel the emotional content by means of a wearable haptic feedback device 814, e.g., a wristband.

While the above embodiment made use of a convolutional neural network (CNN) for the machine learning model, another implementation makes use of a recurrent neural network (RNN). FIG. 9 is a graphical representation of a neural network architecture implemented as recurrent neural network, defining the machine learning model associated with the product. This is another example of one of the main models used to classify the sentiment of speech once the audio has been preprocessed. Included in this recurrent neural network architecture are:

> simple RNN layers configured to recognize patterns,
> flatten layers to linearly alter data sizes,
> activation layers to transform data into useful numbers,
> dense layers to reduce the number of data channels, and
> long short-term memory layers to recurrently recognize patterns in series by using feedback connections and cell states.

Again, it will be appreciated that the various functions of the RNN can be implemented using different layers. For example, linear alteration of the data size, dimensionality reduction, and/or reduction in the number of data channels could be achieved using rescaling, reshaping, or attention layers etc. Data transformation into useful numbers could be achieved using regularization, encoding, or discretization layers, etc. Recurrent recognition of patterns in series using feedback connections and cell states could be achieved using convolutional LSTM layers, gated recurrent units, or stacked recurrent layers, etc.

Together, this combination of layers is trained on classified input data to generate the mathematical weights and biases stored in the proprietary trained neural network of the same structure. When the software is utilized, new input data is run through this trained neural network to classify emotions.

The processor may include a microprocessor or other device capable of being programmed or configured to perform computations and instruction processing in accordance with the disclosure. Such other devices may include microcontrollers, digital signal processors (DSP), Complex Programmable Logic Device (CPLD), Field Programmable Gate Arrays (FPGA), application-specific integrated circuits (ASIC), discrete gate logic, and/or other integrated circuits, hardware or firmware in lieu of or in addition to a microprocessor.

Functions and process steps described herein may be performed using programmed computer devices and related hardware, peripherals, equipment, and networks. Such programming may comprise operating systems, software applications, software modules, scripts, files, data, digital signal processors (DSP), application-specific integrated circuit (ASIC), discrete gate logic, or other hardware, firmware, or any conventional programmable software, collectively referred to herein as a module.

The computer programs (e.g., the operating system, pre-programming stage and convolutional neural network) are typically stored in a memory that includes the programmable software instructions that are executed by the processor. In particular, the programmable software instructions include a plurality of chronological operating steps that define a control logic algorithm for performing the intended functions of the present disclosure. Such software instructions may be written in a variety of computer program languages such as C++, C #, etc.

The memory, which enables storage of data in addition the computer programs, may include RAM, ROM, flash memory and any other form of readable and writable storage medium known in the art or hereafter developed. The memory may be a separate component or an integral part of another component such as processor.

Further, alternative software implementations including, but not limited to, distributed processing or component/object distributed processing, parallel processing, or virtual machine processing can be constructed to implement methods described herein.

The present specification describes components and functions that may be implemented according to particular standards and protocols (e.g., TCP/IP, UDP/IP, HTML, HTTP, etc.)

In a non-limiting exemplary embodiment, a microphone may be used to capture verbal input signals, and the system may include a user interface e.g., a keyboard, mouse, etc.

In a non-limiting exemplary embodiment, the wristband may employ a power source that includes one or more rechargeable or non-rechargeable disposable batteries, photovoltaic cells, and/or an AC adapter or other power supply means.

The transducer may include a mechanical or electro-mechanical device that is capable of generating vibrations, and may be integrated into a wearable device, e.g., a wristband.

The communications device may communicate with the wristband using one or more wireless LAN (WLAN) protocols, using low power, ultra-wide band (UWB) communication signals or some other type of wireless signals for RF or optical (e.g., infrared) communication of information to the wristband. A real-time WLAN protocol or a standard wireless LAN protocol such as that of IEEE 802.11, Bluetooth or IrDA may be used without departing from the scope of the present disclosure. A local network that connects the communications device to its respective local computer systems may, for example, consist of a single, unified full duplex LAN, such as a 100BaseT Ethernet LAN. Alternatively, the local network may include two or more interconnected LANs or other network communications means. Any of a variety of other types of computer systems and associated applications may be provided on the network.

While the disclosure has been described with respect to certain specific embodiment(s), it will be appreciated that many modifications and changes may be made by those skilled in the art without departing from the spirit of the disclosure. It is intended, therefore, by the description here-inabove to cover all such modifications and changes as fall within the true spirit and scope of the disclosure. In particular, with respect to the above description, it is to be realized that the optimum dimensional relationships for the parts of the exemplary embodiment(s) may include variations in size, materials, shape, form, function, and manner of operation.

What is claimed is:

1. A system for enabling a user to tactilely feel the emotion in a verbal input, said system comprising:

> a verbal input receiving device for receiving a spoken input signal;
> a processor and memory configured with machine readable code to define a pre-processing stage and an emotion model in the form of a trained artificial neural network stage for extracting at least one emotion associated with the verbal input, and one or more haptic feedback devices worn by one or more users, which are configured to emit a haptic feedback signal associated with said at least one emotion, wherein the pre-processing stage is configured to generate a multi-dimensional Mel Spectrogram or Mel-Frequency Cepstral Coefficient (MFCC) matrix from time bands defined in the spoken input signal, and to reduce the multi-dimensional matrix to a single dimensional output by taking the mean value for each time band as well as running mean normalization across all the data and feeding this into the artificial neural network stage, and wherein the haptic feedback signal comprises a vibration that is unique for each emotion or combination of emotions extracted by the neural network stage.

2. A system of claim 1, wherein the haptic feedback device comprises a wristband or other wearable item in communication with an output from the artificial neural network stage.

3. A system of claim 1, wherein the users are speakers taking part in live, face-to-face conversation, and the verbal input receiving device comprises a microphone.

4. A system of claim 1, further comprising representing at least one emotion in auditory form to a speaking participant.

5. A system of claim 1, wherein the artificial neural network stage is a recurrent neural network (RNN) that includes layers for performing one or more of:

reducing data overfitting, and transforming data into useful numbers.

6. A system for enabling a user to tactilely feel the emotion in a verbal input, said system comprising:

a verbal input receiving device for receiving a spoken input signal;

a processor and memory configured with machine readable code to define a pre-processing stage, and an emotion model receiving the output of the pre-processing stage as its input, wherein the emotion model comprises a trained neural network stage for extracting at least one emotion associated with the verbal input, wherein the pre-processing stage is configured to generate a multi-dimensional Mel Spectrogram or Mel-Frequency Cepstral Coefficient (MFCC) matrix from time bands defined in the spoken input signal, and take the mean value for each time band and also run mean normalization across all the data to reduce the multidimensional matrix to a single dimensional output; and a haptic feedback device worn by a user, which is configured to emit a haptic feedback signal associated with said at least one emotion, wherein the haptic feedback signal comprises a vibration that is unique for each emotion or combination of emotions extracted by the neural network stage.

7. A system of claim 6 wherein the neural network stage comprises a recurrent neural network (RNN) architecture that includes layers for recurrently recognizing patterns; and layers to transform data into useful numbers.

8. A method of analyzing spoken audio input obtained from one or more speaking participants for emotional content, comprising capturing time bands of the spoken audio input, pre-processing the time bands of the spoken audio input by transforming the time bands into a multi-dimensional Mel-Frequency Cepstral Coefficient (MFCC) matrix or Mel Spectrogram, and reducing the multi-dimensional matrix to a single-dimension output by taking the mean value for each time band as well as running mean normalization across all the data, the method further comprising, feeding the single dimensional output into a neural network to identify at least one emotion in the audio input, and converting the at least one emotion into haptic feedback, wherein the haptic feedback comprises a vibration that is unique for each emotion or combination of emotions identified by the neural network.

* * * * *